(12) United States Patent  
Takata et al.

(10) Patent No.: US 9,337,897 B2
(45) Date of Patent: May 10, 2016

(54) POWER LINE COMMUNICATION SYSTEM

(75) Inventors: Yousuke Takata, Osaka (JP); Yutaka Komatsu, Osaka (JP); Takeshi Hagihara, Osaka (JP); Nobuyuki Nakagawa, Aichi (JP)

(73) Assignees: SUMITOMO ELECTRIC INDUSTRIES, LTD, Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 357 days.

(21) Appl. No.: 14/001,421

(22) PCT Filed: Feb. 1, 2012

(86) PCT No.: PCT/JP2012/052271
§ 371 (c)(1),
(2), (4) Date: Aug. 23, 2013

(87) PCT Pub. No.: WO2012/114838
PCT Pub. Date: Aug. 30, 2012

(65) Prior Publication Data
US 2013/0328528 A1    Dec. 12, 2013

(30) Foreign Application Priority Data
Feb. 23, 2011  (JP) ................. 2011-037438

(51) Int. Cl.
*H02J 7/00* (2006.01)
*H04B 3/54* (2006.01)
(Continued)

(52) U.S. Cl.
CPC .............. *H04B 3/54* (2013.01); *B60L 11/1838* (2013.01); *H04B 3/56* (2013.01); *B60L 2230/12* (2013.01);
(Continued)

(58) Field of Classification Search
CPC ........ H02J 5/005; H02J 7/0027; H02J 7/0065
USPC ................... 320/107–109, 166–167
See application file for complete search history.

(56) References Cited

U.S. PATENT DOCUMENTS

| 5,545,046 A | 8/1996 | Masuda et al. |
| 2008/0123302 A1 | 5/2008 | Kawano et al. |
| 2012/0092141 A1* | 4/2012 | Ichihara ............ H04B 3/54 340/12.32 |

FOREIGN PATENT DOCUMENTS

| CN | 101422089 A | 4/2009 |
| JP | 50-28621 B2 | 3/1975 |

(Continued)

OTHER PUBLICATIONS

Supplementary European Search Report EP Application No. 12 74 9318 dated Dec. 19, 2014.
(Continued)

*Primary Examiner* — Paul Dinh
(74) *Attorney, Agent, or Firm* — McDermott Will & Emery LLP

(57) ABSTRACT

Provided is a power line communication system in which power line communication devices having different configurations from each other coexist. A charging station performs power line communication, using a signal superimposition/separation section in which a capacitor, a coupling transformer, and a capacitor are connected to branch lines branched from two AC lines. An electric vehicle performs power line communication, using a signal superimposition/separation section in which the coupling transformer is inserted in one AC line and a capacitor is connected to and between two AC lines. In a case where the charging station and the electric vehicle are connected to each other with a charging cable, a closed loop circuit is formed that is composed of the AC line, the branch line, the capacitor, a primary coil of the coupling transformer, the capacitor, the branch line, the AC line, an AC line, the AC line, the capacitor, a primary coil of a coupling transformer, the AC line, and an AC line. Thus, power line communication can be performed.

3 Claims, 3 Drawing Sheets

(51) Int. Cl.
    *H04B 3/56*     (2006.01)
    *B60L 11/18*     (2006.01)

(52) U.S. Cl.
    CPC .......... *Y02T 10/6269* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01)

(56) References Cited

FOREIGN PATENT DOCUMENTS

| | | |
|---|---|---|
| JP | 61-101127 A | 5/1986 |
| JP | 61-136327 A | 6/1986 |
| JP | 61-147621 A | 7/1986 |
| JP | 07-192826 A | 7/1995 |
| JP | 2002-261663 A | 9/2002 |
| JP | 2006-261940 A | 9/2006 |
| JP | 2010-226423 A | 10/2010 |
| JP | 2011-015530 A | 1/2011 |

OTHER PUBLICATIONS

International Search Report dated Mar. 19, 2012 issued in PCT/JP2012/052271 with English Translation.

Notification of First Office Action Chinese Serial No. 2014073101045800 dated Aug. 5, 2014 with full English translation.

\* cited by examiner

POWER LINE COMMUNICATION SYSTEM

RELATED APPLICATIONS

This application is the U.S. National Phase under 35 U.S.C. §371 of International Application No. PCT/JP2012/052271, filed on Feb. 1, 2012, which in turn claims the benefit of Japanese Application No. 2011-037438, filed on Feb. 23, 2011, the disclosures of which Applications are incorporated by reference herein.

TECHNICAL FIELD

The present invention relates to power line communication systems in which two devices perform power line communication with each other via power lines, and relates to power line communication systems suitable, for example, for a case where a vehicle, such as an electric vehicle or a plug-in hybrid vehicle, whose battery can be charged by external feeding, and an external feeding device perform power line communication with each other via a charging cable.

BACKGROUND ART

In recent years, there are beginning to prevail electric vehicles and hybrid vehicles which include devices such as motors and batteries and which travel by driving the motors, using power accumulated in the batteries. Electric vehicles need to have their batteries charged by external feeding devices, and even in the case of hybrid vehicles, there are plug-in hybrid vehicles that allow their batteries to be charged by external feeding devices. In a vehicle whose battery is charged from outside, a plug of a charging cable connected to an external feeding device is coupled to a connector device of a charging port provided in the vehicle, and power is supplied from the feeding device to the battery of the vehicle via the charging cable, whereby the battery is charged.

On the other hand, in the case of charging a battery of a vehicle by a feeding device, a communication function is required that allows transmission and reception of information for controlling the charge and information for managing the amount of charge, accounting, etc. between the vehicle and the feeding device. For communication between the vehicle and the feeding device, it is conceivable to use power line communication via a charging cable.

Patent Literature 1 proposes a power line carrier device configured such that data of a frame length of Ethernet is converted into fixed packets shorter than this frame length, to be converted into power line carrier signals using each packet as a unit, thereby performing communication using a power line, and when a communication error occurs, packets are transmitted again. Accordingly, the power line carrier device has an enhanced throughput.

Conventional power line communication devices typically employ a configuration in which two power lines are each branched to have a branch line, and an electromagnetic induction type signal converter (a circuit element such as a coupling transformer) which superimposes and separates a signal on and from the power lines is connected to the branch lines (that is, a coupling transformer or the like is connected to and between the two power lines). The power line carrier device described in Patent Literature 1 has a similar configuration to the above.

CITATION LIST

Patent Literature

[PTL 1] Japanese Laid-Open Patent Publication No. 2002-261663

SUMMARY OF THE INVENTION

Problems to be Solved by the Invention

However, in the configuration of the conventional power line communication device described above, the two power lines need to be branched. Therefore, space for arranging the branching portions of the two power lines and the branched two branch lines is necessary. Since a large number of electronic apparatuses are installed in a vehicle such as an electric vehicle, space for arranging apparatuses in the vehicle is limited. Therefore, when installing a power line communication device having a conventional configuration in a vehicle, it is not easy to secure space for arranging branching portions and branch lines of power lines, and thus downsizing of and saving space for the on-vehicle power line communication device are desired.

On the other hand, with respect to a feeding device, which is installed outside a vehicle such as in a charging station or near a private parking space, space for arranging apparatuses is not so much limited as in the case of a vehicle. Thus, there are cases where it is more preferable to employ a power line communication device having a conventional configuration with proven performance, than to prioritize downsizing of or saving space for the power line communication device. Further, in a charging station considered to be used by various types of vehicles, it may be preferable to employ a widely-adopted power line communication device having a conventional configuration.

Therefore, an object of the present invention is to provide a power line communication system which allows power line communication to be performed at the time of coexistence of a power line communication device having a conventional configuration with proven performance and a power line communication device having another configuration for realizing downsizing and space-saving.

Solution to the Problems

A power line communication system according to the present invention is a power line communication system in which a first device and a second device connected to each other with two power lines perform communication via the power lines, the first device including: a signal superimposition/separation section which is connected to two branch lines respectively branched from the two power lines and which superimposes a signal on the power lines and separates a signal superimposed on the power lines; and a power line communication section which performs power line communication via the signal superimposition/separation section, and the second device including: a signal superimposition/separation section which is inserted in one of the power lines and which superimposes a signal on the power line and separates a signal superimposed on the power line; and a power line communication section which performs power line communication via the signal superimposition/separation section.

Further, in the power line communication system according to the present invention, the signal superimposition/separation section of the first device includes: two capacitors respectively connected to the two branch lines; and an electromagnetic induction type signal converter whose primary coil is connected to the two capacitors and whose secondary coil is connected to the power line communication section, and the signal superimposition/separation section of the second device includes: an electromagnetic induction type signal converter whose primary coil is interposed in the one of the power lines and whose secondary coil is connected to the power line communication section; and a capacitor connected to and between the two power lines.

Further, in the power line communication system according to the present invention, a ratio $n_1$ of the number of turns of the secondary coil of the signal converter of the first device to the number of turns of the primary coil thereof, an input resistance value $R_1$ of the power line communication section of the first device, a ratio $n_2$ of the number of turns of the secondary coil of the signal converter of the second device to the number of turns of the primary coil thereof, and an input resistance value $R_2$ of the power line communication section of the second device satisfy a condition of $$R_1/(n_1)^2 = R_2/(n_2)^2.$$

Further, a power line communication system according to the present invention is a power line communication system in which, in a case where a feeding device and a vehicle are connected to each other via a charging cable including two power lines, a first device provided in the feeding device and a second device installed in the vehicle perform communication with each other via the power lines, the first device including: a signal superimposition/separation section which is connected to two branch lines respectively branched from the two power lines and which superimposes a signal on the power lines and separates a signal superimposed on the power lines; and a power line communication section which performs power line communication via the signal superimposition/separation section, and the second device including: a signal superimposition/separation section which is inserted in one of the power lines and which superimposes a signal on the power line and separates a signal superimposed on the power line; and a power line communication section which performs power line communication via the signal superimposition/separation section.

The present invention is configured such that the first device and the second device connected to each other with two power lines perform power line communication. The first device employs a configuration of a conventional power line communication device, and the second device employs a configuration different from this. That is, in the first device, a signal superimposition/separation section having an electromagnetic induction type signal converter (such as coupling transformer) is connected to two branch lines branched from two power lines. By using this signal superimposition/separation section, the first device performs signal processing such as superimposition of a signal on the power lines and separation of a signal superimposed thereon. In contrast, in the second device, a signal superimposition/separation section having a coupling transformer or the like is inserted in one power line. By using this signal superimposition/separation section, the second device performs signal processing such as superimposition of a signal on the power line and separation of a signal superimposed thereon.

Since the second device has the above configuration, which is different from that of the first device, the second device can perform power line communication. Since it is not necessary to branch the power lines in the second device, space for arranging branching portions and branch lines that have been branched from the power lines is not necessary. Therefore, compared with a power line communication device having a conventional configuration, the second device can realize downsizing and space-saving.

Further, according to the present invention, in the first device, capacitors are connected to two branch lines respectively branched from two power lines, and a primary coil of a coupling transformer is connected to the two capacitors (that is, a branch line, a capacitor, the primary coil, a capacitor, and a branch line are connected in series in this order), to form a signal superimposition/separation section, and a secondary coil of the coupling transformer is connected to a power line communication section. Further, in the second device, the primary coil of a coupling transformer is interposed in one power line and a power line communication section is connected to the secondary coil thereof, and a capacitor is connected to and between the two power lines, to form a signal superimposition/separation section.

In the above configuration, a closed loop circuit is formed, such as: one power line, one branch line, a capacitor of the first device, the primary coil of the first device, a capacitor of the first device, the other branch line, the other power line, the primary coil of the second device, a capacitor of the second device, one power line, and the like, and thus, power line communication via the power lines can be performed.

Further, according to the present invention, in a case where the ratio of the number of turns of the secondary coil of the coupling transformer of the first device to the number of turns of the primary coil thereof is defined as $n_1$, the input resistance value of the power line communication section of the first device is defined as $R_1$, the ratio of the number of turns of the secondary coil of the coupling transformer of the second device to the number of turns of the primary coil thereof is defined as $n_2$, and the input resistance value of the power line communication section of the second device is defined as $R_2$, constants of the circuit elements of the first device and the second device are set so as to satisfy the condition of $$R_1/(n_1)^2 = R_2/(n_2)^2.$$

Accordingly, the first device and the second device can perform power line communication in substantially the same communication frequency band, and thus, it is possible to prevent communication from being blocked due to interference of unexpected noise or the like.

Further, according to the present invention, in a system configuration in which a feeding device and a vehicle are connected to each other via a charging cable and the feeding device supplies power to the vehicle via the charging cable, the feeding device and the vehicle perform power line communication with each other, with the first device provided in the feeding device and the second device provided in the vehicle. With respect to the second device, the power lines need not be branched, and thus, downsizing and space-saving can be realized. Thus, it is suitable for the second device to be installed in a vehicle where space for arranging apparatuses is limited.

DESCRIPTION OF EMBODIMENTS

Figure 1:
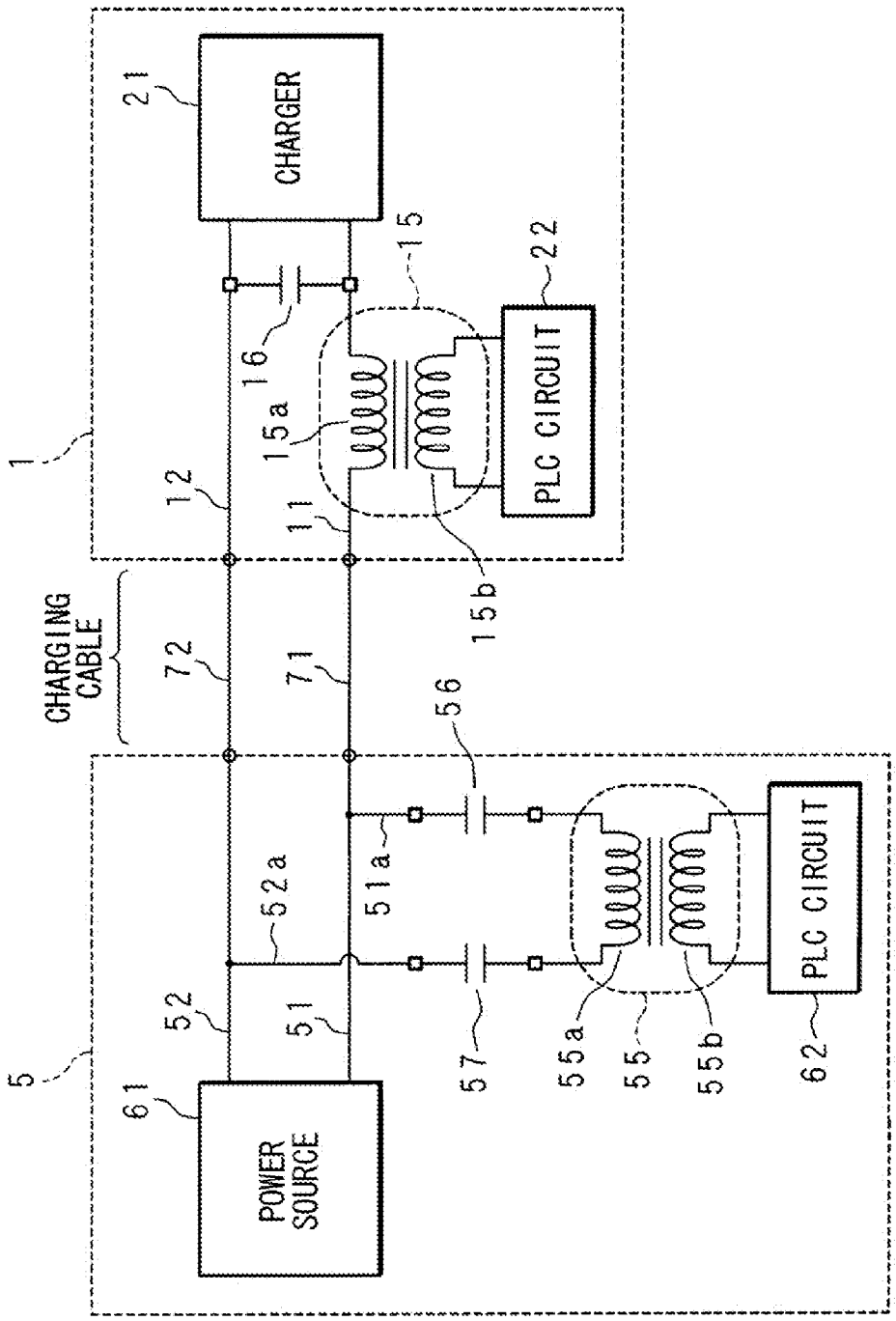
FIG. 1 is a circuit diagram showing a configuration of a power line communication system according to the present invention.

Hereinafter, the present invention will be described specifically, with reference to the drawings illustrating embodiments thereof. FIG. 1 is a circuit diagram showing a configuration of a power line communication system according to the present invention. In the present embodiment, description will be given of an example of a configuration in which when a charging station (feeding device) 5 is connected to an electric vehicle (vehicle) 1 via a charging cable in order to charge a battery (not shown) of the electric vehicle 1, information such as charge control, user authentication, or accounting management is transmitted and received between the charging station 5 and the electric vehicle 1, through power line communication using the charging cable.

The charging cable which connects the electric vehicle 1 to the charging station 5 includes: two power lines (hereinafter, simply referred to as AC lines) 71 and 72 to which an AC voltage is applied; and a grounding wire (not shown) connected to a ground potential. In the present embodiment, a three-wire AC voltage using the two AC lines 71 and 72 and the one grounding wire is supplied from the charging station 5 to the electric vehicle 1.

The charging station 5 includes: two internal power supply wires (hereinafter, simply referred to as AC lines) 51 and 52 to which an AC voltage is applied from a power source; and a grounding wire (not shown), the AC lines 51 and 52 and the grounding wire being respectively connected to the AC lines 71 and 72 and the grounding wire of the charging cable. The AC lines 51 and 52 are connected to a power source 61 of the charging station 5 and guide the AC power outputted by the power source 61 to the charging cable.

To the AC lines 51 and 52, branch lines 51a and 52a are connected, respectively, between the power source 61 and a terminal or the like to which the charging cable is connected, whereby the AC lines 51 and 52 are respectively branched. To the branch lines 51a and 52a, terminals on one side of capacitors 56 and 57 are connected, respectively. To terminals on the other side of the capacitors 56 and 57, a primary coil 55a of a coupling transformer (electromagnetic induction type signal converter) 55 is connected. That is, the branch line 51a, the capacitor 56, the primary coil 55a of the coupling transformer 55, the capacitor 57, and the branch line 52a are connected in series in this order between the two AC lines 51 and 52. A secondary coil 55b of the coupling transformer 55 is connected to a power line communication circuit (hereinafter referred to as PLC (Power Line Communication) circuit) 62.

That is, the power line communication device installed in the charging station 5 includes: a signal superimposition/separation section composed of the capacitors 56 and 57 and the coupling transformer 55; and the PLC circuit 62 connected to the secondary coil 55b of the coupling transformer 55. The PLC circuit 62 can perform receiving processing by separating a signal superimposed on the AC lines 51 and 52 by means of the signal superimposition/separation section, and can perform transmitting processing by superimposing a signal on the AC lines 51 and 52 by means of the signal superimposition/separation section.

The electric vehicle 1 includes two internal power supply wires (hereinafter, simply referred to as AC lines) 11 and 12 which are respectively connected to the AC lines 71 and 72 of the charging cable and which guide the power from the charging station 5 and the charging cable to a charger 21 in the electric vehicle 1. Further, in the electric vehicle, a capacitor 16 is connected to and between the two AC lines 11 and 12, and in the one AC line 11, a primary coil 15a of a coupling transformer (electromagnetic induction type signal converter) 15 is interposed between a connection point of the charging cable and a connection point of the capacitor 16. A secondary coil 15b of the coupling transformer 15 is connected to a PLC circuit 22 in the electric vehicle 1. Although the capacitor 16 between the AC lines 11 and 12 forms a filter circuit, in a case where a similar capacitor is installed in the charger 21, this capacitor may be used in common.

That is, the power line communication device installed in the electric vehicle 1 includes: a signal superimposition/separation section composed of the coupling transformer 15 and the capacitor 16; and the PLC circuit 22 connected to the secondary coil 15b of the coupling transformer 15. The PLC circuit 22 can perform receiving processing by separating a signal superimposed on the AC lines 11 and 12 by means of the signal superimposition/separation section, and can perform transmitting processing by superimposing a signal on the AC lines 11 and 12 by means of the signal superimposition/separation section.

By connecting the charging station 5 and the electric vehicle 1 to each other with the charging cable, two power supply paths are formed: an energizing path in which the AC line 51 of the charging station 5, the AC line 71 of the charging cable, and the AC line 11 of the electric vehicle 1, in the middle of which the primary coil 15a of the coupling transformer 15 is inserted, are connected; and an energizing path in which the AC line 52 of the charging station 5, the AC line 72 of the charging cable, and the AC line 12 of the electric vehicle 1 are connected. In a state where the charging station 5 and the electric vehicle 1 are connected to each other with the charging cable, a closed current loop circuit is formed by the above two power supply paths, and the capacitor 16 connected to and between the AC lines 11 and 12 of the electric vehicle 1, the capacitors 56 and 57 and the primary coil 55a of the coupling transformer 55 connected between the AC line 51 and 52 of the charging station 5. Thus, it is possible to superimpose a signal on the AC lines 11 and 12 and the AC lines 51 and 52 and to extract a signal superimposed thereon by means of the coupling transformers 15 and 55 arranged in this loop, whereby power line communication can be performed between the charging station 5 and the electric vehicle 1.

Figure 2:
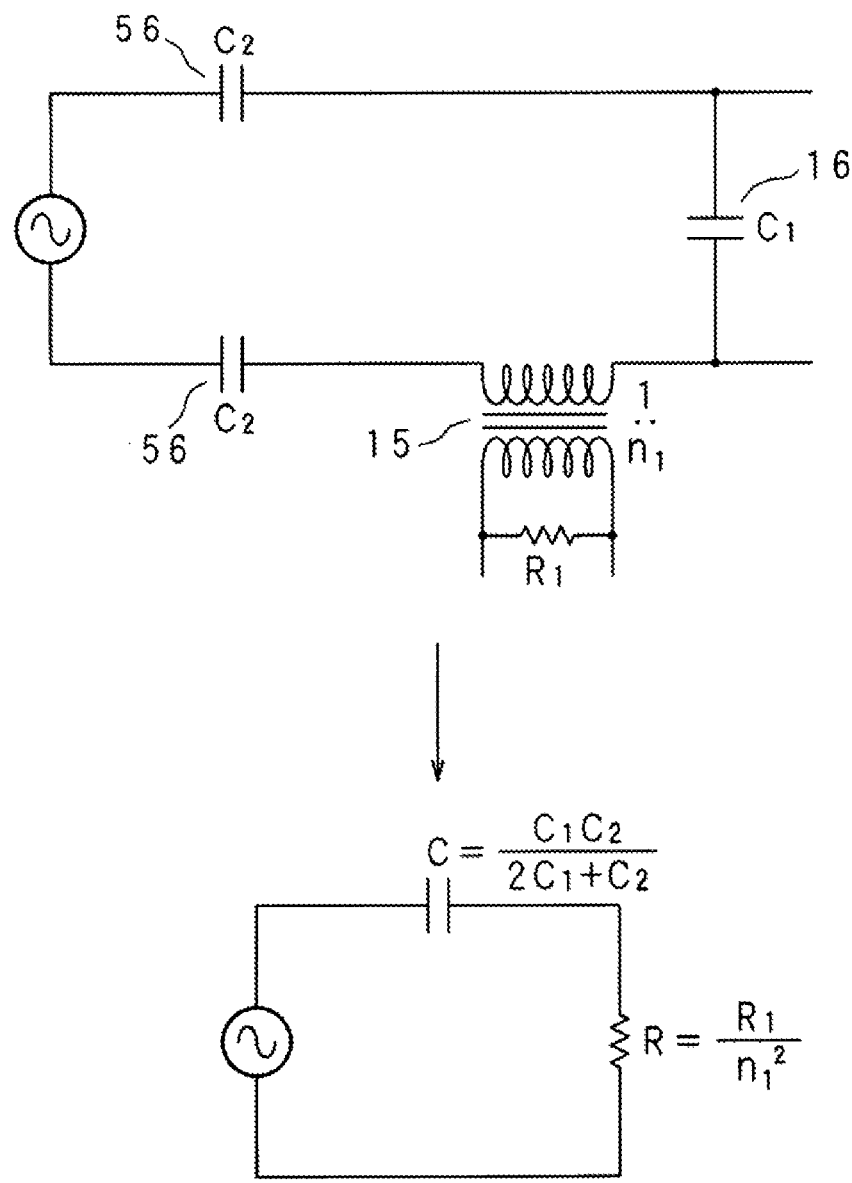
FIG. 2 is a schematic diagram for explaining a method for determining constants for circuit elements included in the power line communication system.
Figure 3:
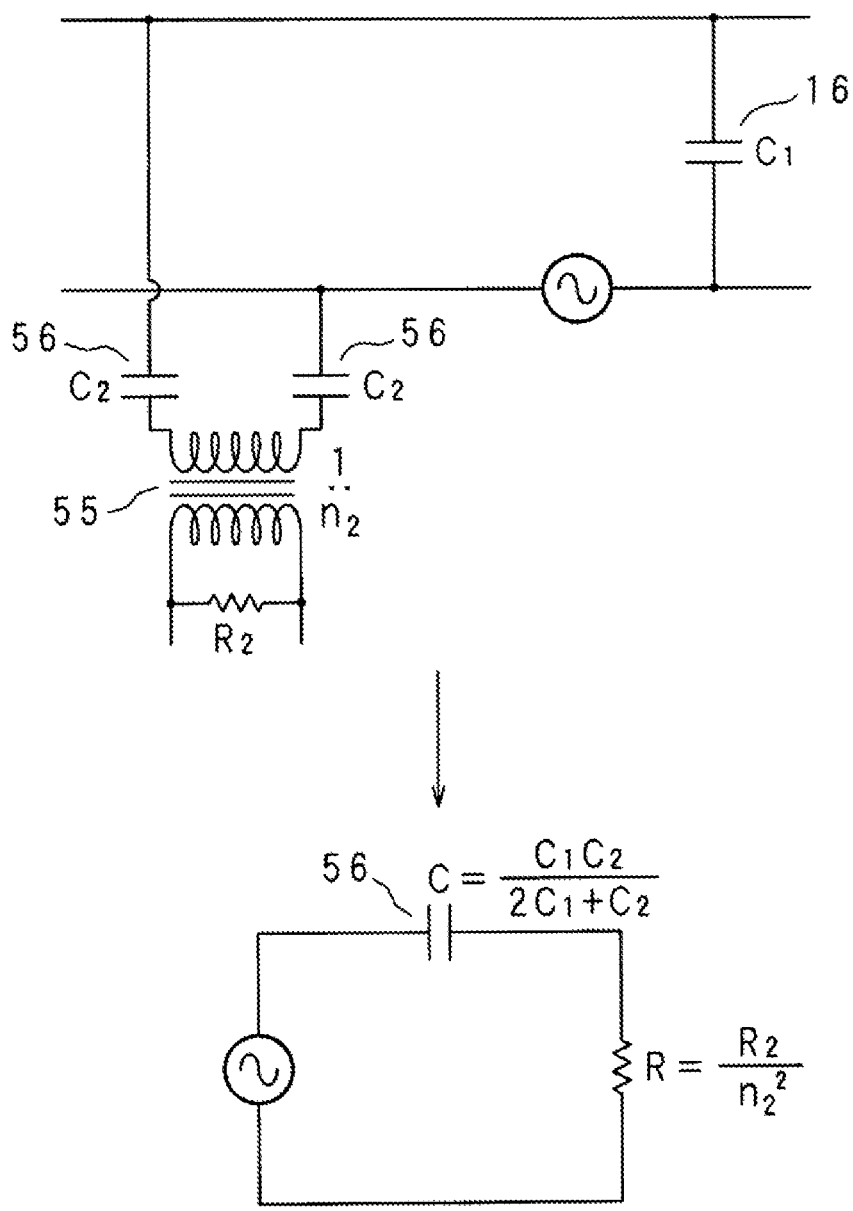
FIG. 3 is a schematic diagram for explaining a method for determining constants for circuit elements included in the power line communication system.

Each of FIG. 2 and FIG. 3 is a schematic diagram for explaining a method for determining constants for circuit elements included in the power line communication system. FIG. 2 shows a circuit configuration in a case where the electric vehicle 1 is assumed as the receiving side in the power line communication, and its equivalent circuit. FIG. 3 shows a circuit configuration in a case where the charging station 5 is assumed as the receiving side in the power line communication, and its equivalent circuit. In FIG. 2 and FIG. 3, the capacitance of the capacitor 16 of the electric vehicle 1 is defined as $C_1$, the ratio between the number of turns of the primary coil 15a and that of the secondary coil 15b of the coupling transformer 15 is defined as primary coil:secondary coil=1: $n_1$, and the resistance value of the input resistance of the PLC circuit 22 is defined as $R_1$, the capacitance of each of the capacitors 56 of the charging station 5 is defined as $C_2$, the ratio between the number of turns of the primary coil 55a and that of the secondary coil 55b of the coupling transformer 55 is defined as primary coil:secondary coil=1: $n_2$, and the resistance value of the input resistance of the PLC circuit 62 is defined as $R_2$. The resistance value of the output resistance of the transmitting side circuit is sufficiently small compared with that of the input resistance of the receiving side circuit, and thus, is not taken into consideration in FIG. 2 and FIG. 3.

In a case where the electric vehicle 1 is assumed as the receiving side, when the transmitting side circuit on the charging station 5 side is defined as a source of a signal, the circuit regarding reception as shown in the upper part of FIG. 2 is obtained, that is, a closed loop circuit is obtained in which, with respect to the source, the capacitor 56, the capacitor 16, the coupling transformer 15, and the capacitor 56 are connected in this order. If converting this circuit into its equivalent circuit composed only of a resistance and a capacitor, the circuit shown in the lower part of FIG. 2 is obtained. In this equivalent circuit, the resistance value R of the resistance satisfies $R=(R_1/(m)^2)$, and the capacitance C of the capacitor satisfies $C=C_1C_2/(2C_1+C_2)$.

Further, in a case where the charging station 5 is assumed as the receiving side, when the transmitting side circuit on the electric vehicle 1 side is defined as a source of a signal, the circuit regarding reception as shown in the upper part of FIG. 3 is obtained, that is, a closed loop circuit is obtained in which, with respect to the source, the capacitor 16, the capacitor 56, the coupling transformer 55, and the capacitor 56 are connected in this order. If converting this circuit into its equivalent circuit composed only of a resistance and a capacitor, the circuit shown in the lower part of FIG. 3 is obtained. In this equivalent circuit, the resistance value R of the resistance satisfies $R=(R_2/(n_2)^2)$, and the capacitance C of the capacitor satisfies $C=C_1C_2/(2C_1+C_2)$.

Here, in order to allow the electric vehicle 1 and the charging station 5 to transmit and receive signals in the same frequency band to and from each other, since the capacitance values C are equal to each other in the equivalent circuits shown in the lower part of FIG. 2 and the lower part of FIG. 3, the resistance values R need to be equal to each other. That is, the following (expression 1) needs to be satisfied.

$$(R_1/(m)^2)=(R_2/(n_2)^2) \qquad \text{(expression 1)}$$

When this conditional expression is not satisfied, the reception frequency bands in the electric vehicle 1 and the charging station 5 are shifted from each other. This may result in receiving noise that should have been blocked, or blocking a signal that should have been received.

In the power line communication system having the above configuration, the PLC circuit 62 of the charging station 5 performs power line communication by using the signal superimposition/separation section in which the capacitor 56, the coupling transformer 55, and the capacitor 57 are connected to the branch lines 51a and 52a branched from the two AC lines 51 and 52, and the PLC circuit 22 of the electric vehicle 1 performs power line communication by using the signal superimposition/separation section in which the coupling transformer 15 is inserted in the one AC line 11 and the capacitor 16 is connected to and between the two AC lines 11 and 12. Accordingly, power line communication devices having different configurations from each other can be installed in the charging station 5 and the electric vehicle 1, respectively. In this configuration, in a case where the charging station 5 and the electric vehicle 1 are connected to each other with the charging cable, a closed loop circuit is formed that is composed of the AC line 51, the branch line 51a, the capacitor 56, the primary coil 55a of the coupling transformer 55, the capacitor 57, the branch line 52a, the AC line 52, the AC line 72, the AC line 12, the capacitor 16, the primary coil 15a of the coupling transformer 15, the AC line 11, and the AC line 71. Accordingly, power line communication can be performed between the charging station 5 and the electric vehicle 1.

In the above-described power line communication device installed in the electric vehicle 1, the AC lines 11 and 12 need not be branched. Thus, it is not necessary to secure space, in the electric vehicle 1, for arranging the branching portions and the branch lines of the AC lines 11 and 12. Therefore, compared with the power line communication device of the charging station 5, the power line communication device of the electric vehicle 1 can realize downsizing and space-saving.

Further, by setting the input resistance values $R_1$ and $R_2$ of the PLC circuits 22 and 62, and the ratios $n_1$ and $n_2$ of the number of turns of the coupling transformers 15 and 55 based on the above-described (expression 1), power line communication devices having different configurations from each other can perform power line communication in substantially the same communication frequency band. Accordingly, it is possible to prevent occurrence of a problem such as receiving noise that should have been blocked or blocking a signal that should have been received, and the like.

In the present embodiment, the charging station 5 is provided with the power line communication device in which the coupling transformer 55 and the capacitors 56 and 57 are connected to the branch lines 51a and 52a branched from the AC lines 51 and 52, and the electric vehicle 1 is provided with the power line communication device in which the coupling transformer 15 is inserted in the one AC line 11 and the capacitor 16 is connected to and between the AC lines 11 and 12. However, the present invention is not limited thereto. The above configurations may be reversed. That is, the electric vehicle 1 may be provided with a power line communication device in which a coupling transformer and capacitors are connected to branch lines branched from the AC lines 11 and 12, and the charging station may be provided with a power line communication device in which a coupling transformer is inserted in the one AC line 51 and a capacitor is connected to and between the AC lines 51 and 52.

Although the electric vehicle 1 has been described as an example of a vehicle provided with a power line communication function, the present invention is not limited thereto. Such a vehicle may be another vehicle having a function of charging a battery from outside, such as a plug-in hybrid vehicle. Further, although the charging station 5 has been described as an example of a feeding device provided with a power line communication function, the present invention is not limited thereto. Such a feeding device may be another device having a function of feeding a vehicle via a charging cable. For example, in a case where a user plugs a charging cable into an outlet in the user's house and charges a vehicle, a power line communication device may be provided on a switchboard or the like of the house. Furthermore, a circuit that performs power line communication may be installed in a charging cable.

Furthermore, with respect to the configuration of the power line communication system according to the present invention, application thereof is not limited to power line communication performed when charging the electric vehicle 1 or the like. The configuration of the power line communication system according to the present invention can be applied to other various communication systems in which power line communication is performed (e.g., systems in which personal computers, portable electronic apparatuses, AV apparatuses, and the like perform power line communication in homes or offices).

As described above, according to the power line communication system of the present embodiment, a first device in which a signal superimposition/separation section having an electromagnetic induction type signal converter such as a coupling transformer is connected to two branch lines branched from two power lines, and a second device in which a signal superimposition/separation section having a coupling transformer or the like is inserted in series in one of the power lines perform signal processing such as superimposition of a signal on the power lines and separation of a signal superimposed thereon, by using the signal superimposition/separation sections. Thus, two devices having different configurations from each other can perform power line communication with each other via the power lines. Accordingly, for example, in a case where a power line communication function is provided in a vehicle or the like where installation space is limited, it is possible to employ the second device which facilitates downsizing and space-saving. Alternatively, for example, in a case where there is enough installation space such as in a feeding device and versatility and proven performance is prioritized, it is possible to employ the conventional-type first device. That is, since power line communication devices having different configurations from each other can perform power line communication with each other, it is possible to select an optimum configuration for an apparatus to be provided with a power line communication function.

DESCRIPTION OF THE REFERENCE CHARACTERS 1 electric vehicle (second device, feeding device)
5 charging station (first device, vehicle)
11, 12 AC line (power line)
15 coupling transformer (signal superimposition/separation section, signal converter)
15a primary coil
15b secondary coil
16 capacitor (signal superimposition/separation section)
21 charger
22 PLC circuit (power line communication section)
51, 52 AC line (power line)
51a, 52a branch line
55 coupling transformer (signal superimposition/separation section, signal converter)
55a primary coil
55b secondary coil
56, 57 capacitor (signal superimposition/separation section)
61 power source
62 PLC circuit (power line communication section)
71, 72 AC line (power line)

The invention claimed is:

1. A power line communication system in which a first device and a second device connected to each other with two power lines perform communication via the power lines,
the first device comprising:
a signal superimposition/separation section which is connected to two branch lines respectively branched from the two power lines and which superimposes a signal on the power lines and separates a signal superimposed on the power lines; and
a power line communication section which performs power line communication via the signal superimposition/separation section, and
the second device comprising:
a signal superimposition/separation section which is inserted in one of the power lines and which superimposes a signal on the power line and separates a signal superimposed on the power line; and
a power line communication section which performs power line communication via the signal superimposition/separation section;
wherein the signal superimposition/separation section of the first device includes:
two capacitors respectively connected to the two branch lines, and
an electromagnetic induction type signal converter whose primary coil is connected to the two capacitors and whose secondary coil is connected to the power line communication section; and
the signal superimposition/separation section of the second device includes:
an electromagnetic induction type signal converter whose primary coil is interposed in the one of the power lines and whose secondary coil is connected to the power line communication section, and
a capacitor connected to and between the two power lines.

2. The power line communication system according to claim 1, wherein
a ratio $n_1$ of the number of turns of the secondary coil of the signal converter of the first device to the number of turns of the primary coil thereof, an input resistance value $R_1$ of the power line communication section of the first device, a ratio $n_2$ of the number of turns of the secondary coil of the signal converter of the second device to the number of turns of the primary coil thereof, and an input resistance value $R_2$ of the power line communication section of the second device satisfy a condition of $R_1/(n_1)^2 = R_2/(n_2)^2$.

3. A power line communication system in which, in a case where a feeding device and a vehicle are connected to each other via a charging cable including two power lines, a first device provided in the feeding device and a second device installed in the vehicle perform communication with each other via the power lines,
the first device comprising:
a signal superimposition/separation section which is connected to two branch lines respectively branched from the two power lines and which superimposes a signal on the power lines and separates a signal superimposed on the power lines; and
a power line communication section which performs power line communication via the signal superimposition/separation section, and
the second device comprising:
a signal superimposition/separation section which is inserted in one of the power lines and which superimposes a signal on the power line and separates a signal superimposed on the power line; and
a power line communication section which performs power line communication via the signal superimposition/separation section;
wherein the signal superimposition/separation section of the first device includes:
two capacitors respectively connected to the two branch lines, and
an electromagnetic induction type signal converter whose primary coil is connected to the two capacitors and whose secondary coil is connected to the power line communication section; and
the signal superimposition/separation section of the second device includes:
an electromagnetic induction type signal converter whose primary coil is interposed in the one of the power lines and whose secondary coil is connected to the power line communication section, and
a capacitor connected to and between the two power lines.

* * * * *